United States Patent
Kivirauma et al.

(10) Patent No.: US 9,538,140 B2
(45) Date of Patent: Jan. 3, 2017

(54) SOCIAL TELEVISION SERVICE

(75) Inventors: Kimmo Kivirauma, Kangasala AS (FI); Jussi Tarvainen, Tampere (FI)

(73) Assignee: TELIASONERA AB, Stockholm (SE)

( * ) Notice: Subject to any disclaimer, the term of this patent is extended or adjusted under 35 U.S.C. 154(b) by 0 days.

(21) Appl. No.: 13/247,091

(22) Filed: Sep. 28, 2011

(65) Prior Publication Data
US 2012/0079535 A1 Mar. 29, 2012

(30) Foreign Application Priority Data

Sep. 29, 2010 (EP) .................................. 10182181

(51) Int. Cl.
*G11B 27/031* (2006.01)
*H04N 21/4788* (2011.01)
*H04N 7/16* (2011.01)
*H04N 21/25* (2011.01)
*H04N 21/44* (2011.01)
*H04N 21/472* (2011.01)
*H04N 21/8545* (2011.01)
*H04W 4/02* (2009.01)

(52) U.S. Cl.
CPC ............. *H04N 7/16* (2013.01); *H04N 21/252* (2013.01); *H04N 21/44008* (2013.01); *H04N 21/4788* (2013.01); *H04N 21/47205* (2013.01); *H04N 21/8545* (2013.01); *H04W 4/021* (2013.01)

(58) Field of Classification Search
USPC ....................... 725/37, 40, 115; 715/751, 764
See application file for complete search history.

(56) References Cited

U.S. PATENT DOCUMENTS

| 5,539,871 A | * | 7/1996 | Gibson | G06F 3/0489 |
| | | | | 375/E7.008 |
| 5,689,717 A | * | 11/1997 | Pritt | G06T 11/60 |
| | | | | 345/619 |
| 5,774,172 A | * | 6/1998 | Kapell et al. | 725/139 |

(Continued)

FOREIGN PATENT DOCUMENTS

| EP | 1 119 192 A2 | 7/2001 |
| EP | 1 225 763 A1 | 7/2002 |
| WO | 02/37943 A2 | 5/2002 |

OTHER PUBLICATIONS

European Search Report, dated Feb. 28, 2011, from corresponding European application.

*Primary Examiner* — Nathan Flynn
*Assistant Examiner* — Tung T Trinh
(74) *Attorney, Agent, or Firm* — Young & Thompson

(57) ABSTRACT

A method, a receiver, a computer program and a system for providing an interactive service in association with a motion picture service. The motion picture is displayed to the spectator via a receiver able to modify the motion picture displayed to the spectator and having a bi-directional network connection. The method, receiver, computer program and system are characterized in that a connection is formed that connects a plurality of participants to an interactive motion picture session, a selection of a target area in the motion picture is received, a selection of a graphical element to be associated with the target area is received, the target area is translated to a coordinate system shared by each participant in the interactive motion picture session and the graphical element is provided between the participants.

18 Claims, 4 Drawing Sheets

(56) References Cited

U.S. PATENT DOCUMENTS

| | | | |
|---|---|---|---|
| 7,773,095 B1* | 8/2010 | Badrak | G06F 17/30241 345/619 |
| 7,779,439 B2* | 8/2010 | Sie | H04N 5/44543 725/32 |
| 2003/0040341 A1* | 2/2003 | Casais | G06F 17/30905 455/566 |
| 2003/0097301 A1 | 5/2003 | Kageyama et al. | |
| 2005/0068290 A1* | 3/2005 | Jaeger | G06F 3/04845 345/156 |
| 2005/0108656 A1* | 5/2005 | Wu et al. | 715/801 |
| 2005/0289179 A1* | 12/2005 | Naphade | G06K 9/6292 |
| 2006/0079319 A1* | 4/2006 | Aoki | G07F 17/3267 463/25 |
| 2007/0009043 A1* | 1/2007 | Craig | A63F 13/12 375/240.24 |
| 2008/0209480 A1* | 8/2008 | Eide | G11B 27/105 725/87 |
| 2008/0218532 A1* | 9/2008 | Young | G06F 9/4443 345/660 |
| 2009/0024922 A1* | 1/2009 | Markowitz | G06F 17/30056 715/716 |
| 2009/0077503 A1* | 3/2009 | Sundstrom | G06F 3/04812 715/856 |
| 2009/0092374 A1 | 4/2009 | Kulas | |
| 2009/0249386 A1* | 10/2009 | Shan | G06Q 30/02 725/32 |
| 2009/0276802 A1* | 11/2009 | Amento | G06T 13/40 725/32 |
| 2009/0297118 A1* | 12/2009 | Fink | G06F 17/3082 386/278 |
| 2010/0070878 A1* | 3/2010 | Amento | G11B 27/034 715/751 |
| 2010/0093444 A1* | 4/2010 | Biggar | G07F 17/3295 463/43 |
| 2010/0095326 A1 | 4/2010 | Robertson, III | |
| 2011/0131605 A1* | 6/2011 | Pratt | G06F 17/30994 725/39 |
| 2012/0167145 A1* | 6/2012 | Incorvia | H04N 21/4725 725/60 |
| 2013/0027425 A1* | 1/2013 | Yuan | G06F 3/0484 345/629 |
| 2013/0314438 A1* | 11/2013 | Borcherdt | G06T 11/00 345/629 |
| 2014/0188815 A1* | 7/2014 | Mentz | G06Q 10/06 707/689 |

* cited by examiner

SOCIAL TELEVISION SERVICE

FIELD OF THE INVENTION

The invention relates to interactive television. Particularly, the invention relates to a method and apparatus for providing an augmentation content sharing service, which allows users to share augmentation content in association with a moving picture delivery service, such as television service and to augment the moving picture with the shared augmentation content.

BACKGROUND OF THE INVENTION

Interactive television services have been developed since the digital television service has been available. In addition to the ordinary digital television service, interactive services have problems that relate to data communications and incompatibility. Traditionally, television sets have been able to receive broadcast transmissions. In order to provide interactive services in association with a moving picture transmission or delivery service, a receiver unit of the service consumer, such as a television set, a set-top box or a computer, must also be able to transmit information back to server computers and other similar apparatuses provisioned by service provider of the moving picture transmission or delivery service provider or a party affiliated with the service provider. The transmission of information back to the service provider is catered for with a back-channel or, in other words, a reverse-channel, which may be an Internet connection over a Digital Subscriber Line (DSL) such as ADSL, an Integrated Services Digital Network (ISDN) connection or a modem connection. The connection may also be by a bi-directional cable television providing an Internet service in association with cable television service. The back-channel or the reverse channel must provide for an Internet Protocol (IP) network connectivity to the server computers of the service provider. The server computer may be provided with sufficient knowledge on the content of the moving picture to be able to associate request messages received via the back-channel with a particular service request.

The most common interactive services include interactive program guide, web browsing, video on demand, chat services and other similar services. The services can be implemented so that they are available at the same time as the ordinary broadcast service or equivalent scheduled moving picture content delivery service. For example, it is possible to watch a football game and share comments with a friend on a chat screen that is located in a separate area on the screen.

A modern television set comprises a digital receiver. Most advanced digital receivers are able to provide the services mentioned above and even more, as they are capable of executing software products in a processor and memory associated with the digital receiver. The receivers may include a mass storage device such as a hard disk drive for storing television programs or computer software to be executed. When the receiver is started, it loads the software needed for the services mentioned above, such as the chat screen application mentioned above.

The problem of the known applications is that they are very limited. Limitations are caused by incompatibility and limited data transfer capabilities. Thus, there is a need for a mechanism for providing advanced interactive functions in a television.

SUMMARY

The invention relates to a method, a receiver, a computer program and a system for providing an interactive service in association with a motion picture service. The motion picture is displayed to a spectator by means of a receiver being able to modify the motion picture displayed to the spectator and having a bi-directional network connection. The method, receiver, computer program and system are characterized in that a connection is formed that connects a plurality of participants to an interactive motion picture session, the plurality of participants comprising the spectator, a selection of a target area in the motion picture is received, a selection of a graphical element to be associated with the target area is received, the target area is translated to a coordinate system shared by each participant in the interactive motion picture session and the graphical element is provided between the participants.

In one embodiment of the invention, there is a mechanism for providing advanced interactive features in association with a television broadcast service or any moving picture delivery or transmission service. In other words, there is provided an augmentation content sharing service, in which augmentation content is presented on top of a moving picture, that is, the moving picture becomes augmented. The client device in which the augmented moving picture is consumed, that is, viewed, may be a digital or an analog television, a set-top-box, a Home Theatre Personal Computer (HTPC) connected to or comprising a separate display unit or a projector, a laptop computer, a desktop computer, a palmtop computer, a mobile communication device such as a mobile phone, a game console, a portable gaming device or any computer apparatus.

The client device, for example, a television or a set-top-box used in the embodiment of the invention needs to have a bi-directional network connection. The different data communication directions may be based on different technologies, for example, at least one of broadcasting, multicast, unicast, wireless and wired. A plurality of different connection types are known to a person skilled in the art, for example, a home network connected to the Internet.

In the embodiments of the invention, the following definitions should be assumed.

An interactive session means a functionality wherein augmentation content is transmitted and presented onto the screens of the users of a television or moving picture content delivery service. The augmentation content may be added as an extra layer over the usual moving picture content layers in the manner of, for example, sprite graphic images and sprite text. The augmentation content, that is, information may include, for example, a balloon having a text or a circle or a magnifying glass for pointing out some details of the service. Generally, the augmentation content may comprise moving picture such as video, audio, still pictures, graphics images of various forms and varying contour, text of various fonts and sizes, user interface dialogs, symbols, icons, pointers, animations, visual user interface gadgets and prompts.

The service may be a digital or analog television signal broadcast service, moving picture content delivery over an IP network using broadcast, multicast or unicast, IP datacast in broadcast network such as a mobile communication network, IP datacast over a Wireless LAN, any cell broadcast in a mobile network, shared video on demand over an ATM network or any other packet or switched network, or generally some other multimedia service type that is shared among a plurality of people. Characteristic to a moving picture service that benefits of an interactive session may be that it has sufficient scheduling to enable the viewing of similar content by multiple users.

The interactive session may be open to everybody or shared by a limited number of users that may be chosen according to the preferences of the inviter of the interactive session. The preference may be defined in an access control list file or any other access rights file delivered to a server, which is checked prior to allowing the establishment of the session towards a given party, either by the session requester node or a node receiving such a request.

An interactive client is an entity comprising at least one of software and hardware implemented in the client device such as a computer, a television or a set-top-box attached to a television. The interactive client is typically controlled by the same remote control device as the client device such as the computer, the television set or the set-top-box attached to a television. In one embodiment of the invention, a mobile communication device may be used as the remote control device to communicate with the client device, for example, using an infrared connection, a Bluetooth connection, a WLAN connection or any communication established via the mobile communication system of the mobile communication device, such as the Universal Mobile Telecommunications System (UMTS) or the GSM system.

An interactive server is a network node that is accessed by the client using the client device that executes the interactive client. The interactive server may be used for communication or only as a source of the newest version of the client software or firmware. For example, the interactive server may provide the latest library of interactive elements to the interactive clients. If the interactive server is not used for communication between the clients, a peer-to-peer network may be arranged. The peer-to-peer network may be based on, for example, Bittorrent or Gnutella and comprise a Distributed Hash Table (DHT) to store the interactive client software for downloading to the client device.

An interactive session may be joined or left by each user as they wish. The session may be initialized so as to end only when there are no users left or so as to end when the inviter of the session leaves.

The elements provided as part of the interactive session may be audio, visual, tactile or olfactory elements or any combination of them. The most typical elements are boxes, balloons, symbols or icons that are arranged on top of the picture, in other words, augmented over moving picture content such as broadcasted television picture. The elements may also be displayed over a still caption image captured from the moving picture frames or signal. The elements may be modified so that the size and shape can be changed. However, typically the elements are chosen from a standard element library that is arranged in all of the interactive clients so that the need for data transfer is kept slow.

In an embodiment of the invention, the screen of the television is divided in a grid. The dimensions of the grid are same in each of the interactive clients. Thus, if user A decides that he would like to add a balloon with a text "HELLO" to a location which is next to a person, a figure or other visual object in the television program, it is shown on the screens of other users on the same position.

In a further embodiment of the invention, the elements placed on the grid are taken from an element library. The element library must be loaded to each of the clients and it is typically downloaded from the interactive server. The interactive server typically automatically notifies the clients if there is a newer version of the client. As the elements are transferred only once, there is a reduced need for data transfer and the service can be used also with limited bandwidth.

In a further embodiment, objects on the screen are recognized by using appropriate methods. The methods may comprise object texture based visual object recognition methods, contour based visual recognition methods or methods that recognize visual object area based on uniform motion vectors for macroblocks in a motion prediction frames during a time interval. Any combination of these may also be used.

Then, the interactive client can be used to lock an element on a certain object on the screen. For example, in a football game the user might want to follow one particular player, which is feasible.

The embodiments of the invention described hereinbefore may be used in any combination with each other. Several of the embodiments may be combined together to form a further embodiment of the invention. A method, a system, an apparatus, a computer program or a computer program product to which the invention is related may comprise at least one of the embodiments of the invention described hereinbefore.

The benefit of the present invention is that it provides a mechanism for providing interactive communication in television service. The present invention solves the technical problems related to the compatibility, usability issues and user friendliness issues. The users of the invention do not necessarily need to have similar television sets. The users may use the remote control device that they use to control the moving picture service client device to control the interactive service and the interactive client within the client device. The remote control may also be used for audiovisual communication.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
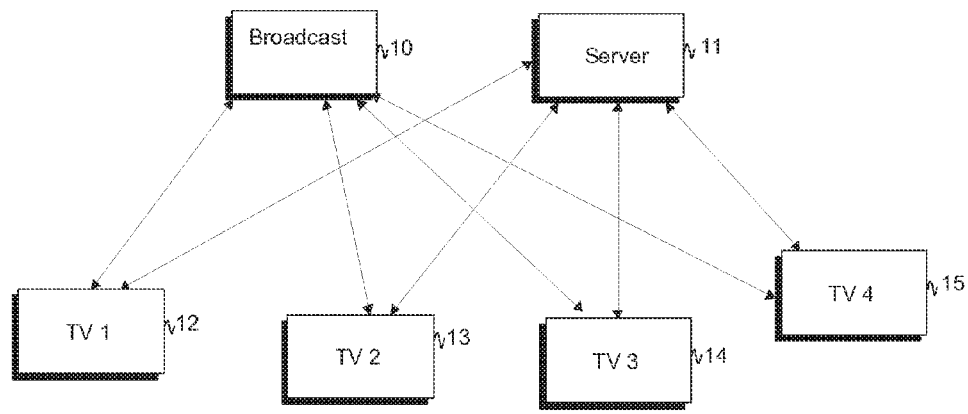
FIG. 1 is block diagram of an embodiment according to the present invention.

In FIG. 1, a block diagram of an embodiment according to the present invention is disclosed. In FIG. 1, four spectators have joined in an interactive session.

FIG. 1 illustrates an interactive augmentation content sharing service, which allows a moving picture content to be augmented with the augmentation content. A moving picture content delivery service is transmitted, for example, in FIG. 1 from a broadcast station 10 to each of the television receivers 12-15. The moving picture may be delivered to the receiver in addition to broadcasting over the air, for example, via IP datacast, via a cable television network, via a cellular network, via a WLAN, or via any IP network. In the case of the Internet or other network connection, the broadcast may be multicast or unicast or delivery over a peer-to-peer protocol that supports delivery from multiple sources simultaneously or other suitable stream may be used; however, the same stream is shown to all participants. It must be noted that if delivery over a peer-to-peer protocol that supports delivery from multiple sources is used, a separate timing must be shared between the participants to enable, for example, the commenting of same content at the same time. For interactive communication, all of the spectators must watch the stream at the same time; however, it is also possible to store the modified stream for later view and possibly use a separate timing downloadable as a file or transmitted as a specific signal over any network.

Receivers 12-15 are digital television receivers that are capable of executing software code. The actual receiver may be integrated in a television set, a set-top-box or a computer that is arranged to display the received stream.

In FIG. 1, the stream is received from the broadcast station 10 that only transmits the broadcast signal. The receivers are further connected to a server 11. In the embodiment of FIG. 1, the server is arranged to provide the needed software library to clients. Typically, when a client connects to the server, the version of the library is checked, for example, so that the client or a proxy associated with the client informs to the server the current version of the library in the client and so that the server responds with the latest version. If the server has a newer version of the library than the receiver, then the library is sent to the receiver, for example, in a hypertext transfer protocol message. In the embodiment of FIG. 1, all communications are arranged via the server 11. When the user of the receiver uses interactive services, the data is transmitted via the server. Data transmission is possible to arrange also in the form of a peer-to-peer network; however, even in these cases it is beneficial to have a server for distributing the library so that the newest features are always available to all participants.

Figure 2:
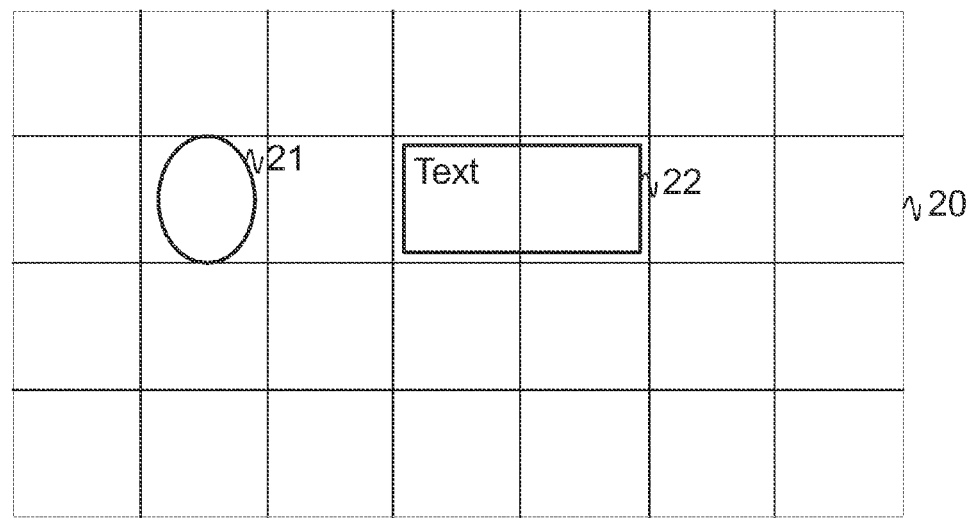
FIG. 2 is a view of an embodiment according to the present invention.

FIG. 2 discloses a screen according to the invention. The purpose of the grid is to provide position information for the elements that the user of the interactive receiver wants to send to the other people that have joined in the session. In FIG. 2, a 7*4 grid can be seen. The resolution of the grid is just an example. Dimensions of the grid may be freely chosen as long as they are the same for all of the participants in the interactive session. When the positioning of elements is based on the grid, the real resolution of the display device needs not to be the same. For example, in Full High Definition (HD) television sets it is 1920*1080 and in some HD ready television sets it can be 1366*768 pixels. Thus, the effective number of pixels within a cell of the grid varies. This information can be used for scaling the elements so that the chosen element is similar in size. The receiver receiving interactive elements performs the scaling as it is aware of the resolution of the display device. If the receiver is not capable of scaling the elements based on screen resolution, the interactive service provides a tool for the user to manually set the receiver screen resolution.

In FIG. 2, two different elements are located on the screen 20. A circle 21 is located in (2,2) of the grid. The size of the circle is one cell. The circle has no text. A box 22 is located in (4,2)(5,2) and it has a message "text". The implementation of the actual signaling depends on the functionality that is implemented. For example, if the elements from the library are available only in standard sizes and colors, then the position and possible text message have to be communicated. However, for a better user experience, it is expected that the elements may be modified. For example, the size and color may be changed according to the need of the user. In that case, more information must be transmitted in the signaling. In most advanced embodiments, the elements can be freely designed by users. In the case of custom elements, they need to be distributed to everybody in the session. This may be done when initiating the session or when the custom element is needed for the first time. The custom elements are preferably designed on the canvas used for determining the properties of the elements.

In a more advanced embodiment, the elements may be attached to a certain object. The object is initially pointed by using the grid. Then, object recognition methods are used in following the object. For example, if the user is watching a football game, all of the participants may tag their favorite players or one of the participants may recommend certain players to be followed.

Figure 3:
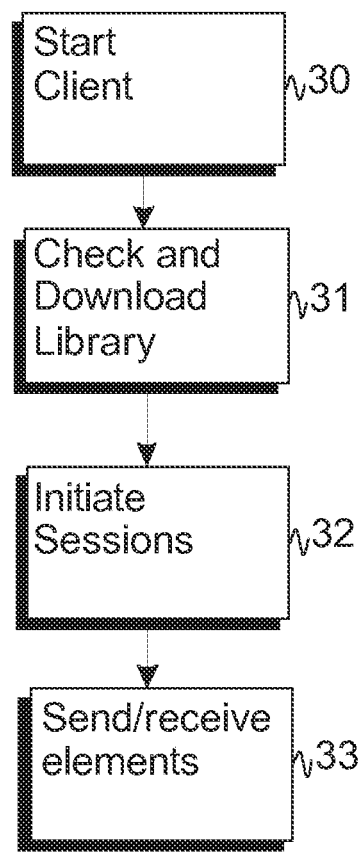
FIG. 3 is a flow chart of an embodiment of the invention.

In FIG. 3, an embodiment of the invention is disclosed. In the embodiment, the client is first started, step 30. Then, the server is contacted for verifying the version of the library, step 31. If a newer library is available, it is downloaded and installed in the device. Otherwise, the session is initiated in step 32. In initiation, the participants are invited or the session is declared public for everybody or a limited audience. The participants are connected to each other directly or via a server. Then, the dimensions of the grid are determined, unless the receiver initiating the session provides the option to choose the grid. In the embodiment, the initiation message is sent to the server as the example of FIG. 3 is server-based; however, it could be also a peer-to-peer-based solution. After initiation, it is possible to send and receive interactive elements, step 33. The users may join and leave the session as they wish. When sending interactive elements, the properties of the element are determined on a canvas or on other design tool that provides tools for the user to choose the element and the position where it is positioned.

In one embodiment of the invention, the present invention is implemented as a software module that is installed in a television set or set-top-box receiving a digital television broadcast signal. The software module is embodied on a computer-readable medium, such as a hard disk drive, memory card, compact disk or other similar subject matter.

Figure 4:
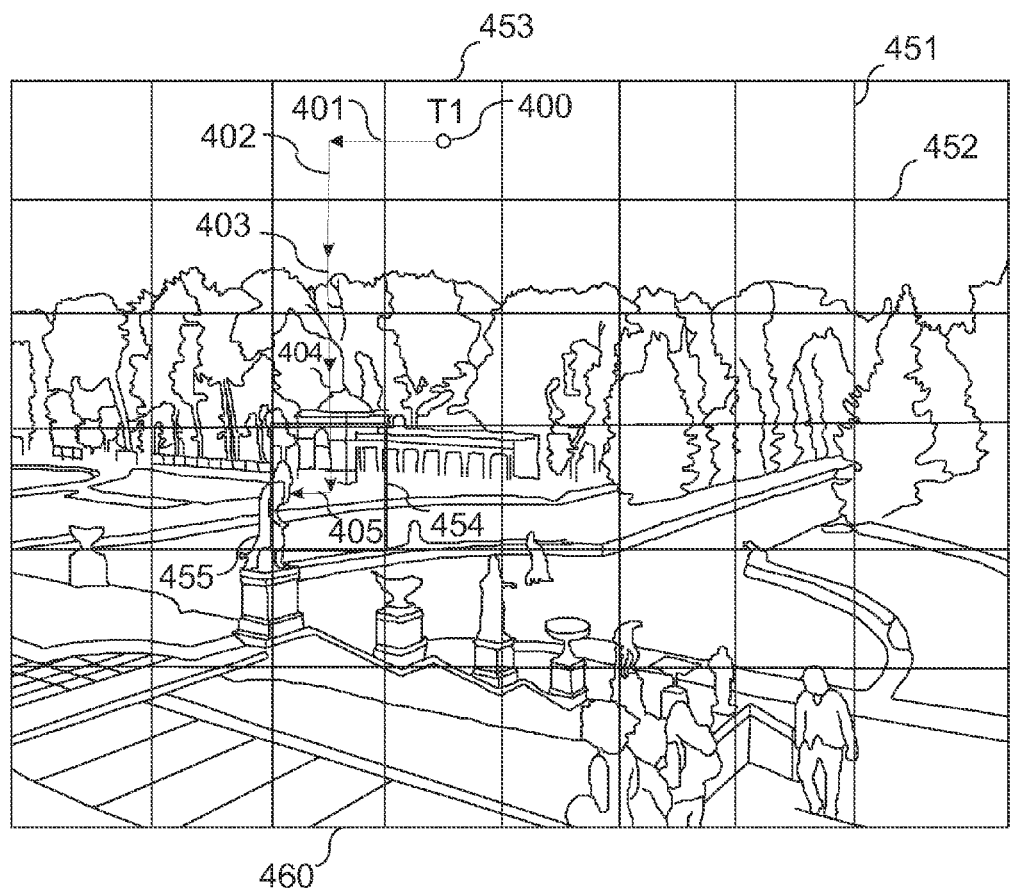
FIG. 4 is a exemplary image illustrating the use of a shared grid in an embodiment of the invention.

FIG. 4 is an exemplary image illustrating the use of a shared grid in association with an augmentation content sharing service, in an embodiment of the invention. In FIG. 4 there is illustrated a moving picture content 460 that is being presented to a number of users. The moving picture content may be, for example, a digital television program on, for example, art history regarding St. Petersburg and Peterhof. To program is being watched simultaneously by a number of art students, for example, who wish to exchange questions, remarks or suggestions with, for instance, graphics and text as augmentation content to render the program augmented. In FIG. 4 there is a shared grid which comprises, for example, 6 times 7 grid elements, that is, slots. Examples of grid lines are lines 451 and 452. The starting point in FIG. 4, at time T1, is that a pointer 400 is located in the grid element 453, which may be a default location for pointer 400. The grid lines are not necessarily shown to users.

A user manipulating his remote control device communicates with a client device supporting an augmentation content sharing and augmented moving picture rendering service. The user navigates pointer 400, for example, using cursor keys in the remote control device between different grid elements. The pressing of a left key results in the placing of pointer 400 to a grid element one step to the left, as illustrated with arrow 401. Thereupon, the user presses a down key three times, as illustrated with arrows 402, 403 and 404, which places pointer 400 to grid element 454. Thereupon, client device may start automatically finding separate visual elements in picture 460. The automatic finding may rely on texture, figure, contour or motion vector based recognition of visual features that characterize a shape of interest. In the case of FIG. 4, statue 455 may get automatically selected because of its human form or because of its gold color or a uniform texture of sufficient size. Other possible selection criteria may comprise human faces and letters. Statue 455 is selected automatically after the user has moved pointer 400 to grid element 454, as illustrated with arrow 405. If there are multiple matching visual elements that might be candidates for augmentation in a given grid element the user may be allowed to choose between them. This occurs, for example, so that the user uses the cursor keys to select between different visual elements highlighted by the client device. In response to the selection of a given visual element, a coordinate location well within the visual element is recorded by the client device. If simply a given grid element is selected without the feature of locking to a specific visual element, the coordinates of the grid element are recorded. The user may also use, for example, number keys to select between the visual elements highlighted in a selected grid element. Many different methods of selecting visual objects from the display may also be conceived. For example, the user may use number keys to selected different grid elements of the display when the display is arranged as a grid of 3 times 3 elements. However, the user may make the selection more precise so that a grid element thus selected may be subjected to a division into a sub-grid of 3 times 3 elements and so on. Further, it is conceivable that the display may be touch-sensitive, which allows the direct selection of visual elements with fingers or a stylus device, or even by delineating an area with multiple fingers to catch multiple moving visual elements. Further, the use of any pointer device such as a mouse, a trackball, a wand or an accelerometer based pointer may be applied for the selection of visual elements. To assist the user's selection process, visual elements may have an attraction which drags any pointer towards them when they are at least within a predefined distance from the pointers current position. At least part of the selectable visual elements may also be pre-indicated by the moving picture service provider, for example, in the form of Motion Picture Experts Group (MPEG) MPEG-7 metadata or as other structured document based metadata or as a stream of object coordinate information. At least part of the selectable visual elements may also be pre-indicated by the receiving client device based on automatic feature recognition of, for example, human forms, faces, text and other typical objects.

In one embodiment of the invention, the repeated pressing of a number key selects the neighboring grid elements one by one.

In one embodiment of the invention, upon the pressing of a key used in the process for selecting a visual element, the moving picture content to be augmented is paused or slowed down by a factor to enable a disturbance-free selection of the visual element desired. In one embodiment of the invention, a still picture may be formed of the paused moving picture and the still picture may be shared with other parties that take part in the augmentation content sharing session.

Figure 5:
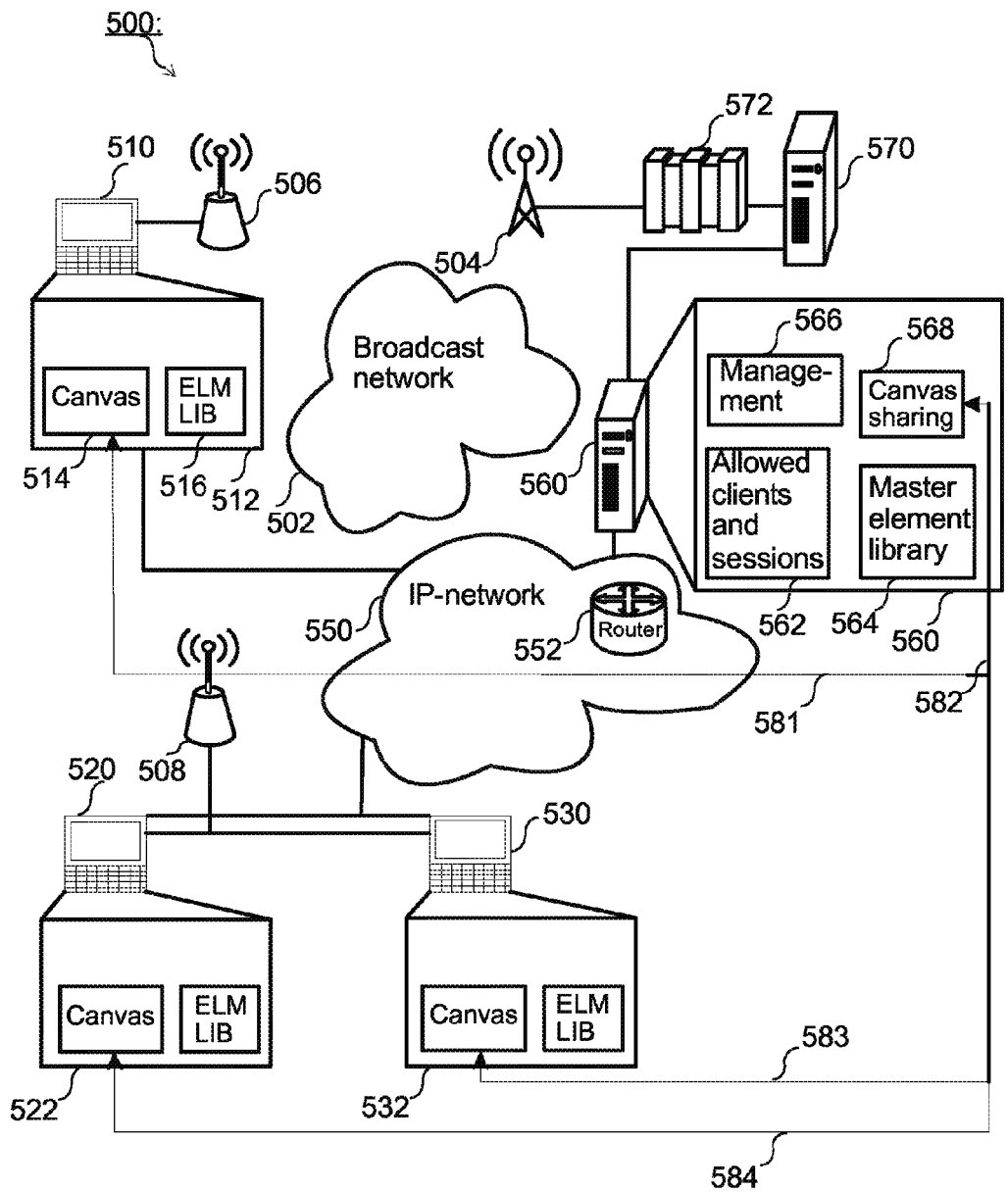
FIG. 5 is a block diagram illustrating a system applying an augmentation content sharing and moving picture augmentation in an embodiment of the invention.

FIG. 5 is a block diagram illustrating a system applying augmentation content sharing and moving picture augmentation in an embodiment of the invention. In FIG. 5 a system 500 there is a broadcast network 502 and an IP-network 550, such as the Internet, an Intranet or any packet switched network. IP-network 550 comprises a router 552. Broadcast network 502 is supported by at least one broadcast transmitter 504. A digital or an analog signal is provided to broadcast transmitter 504 using a broadcaster server 572, which stores at least part of the information to be transmitted using a broadcast signal, for example, in carousel files. Broadcaster server 572 provides content, for example, in Motion Picture Experts Group (MPEG) coded format, such as MPEG-2 or MPEG-4. Broadcaster server 572 is connected to a content provider server 570, which provides the actual moving picture content, either in a raw format or in a right format for broadcasting, such as MPEG-2. There is also a session server 560, which supports the service for augmentation content sharing and moving picture augmentation. The internal functions of session server 560 are illustrated with box 561. Session server 560 comprises at least one processor and a memory, which comprises an access file 562, that is, a file of allowed clients and sessions, a master element library 564, a management entity 566 that manages the service and a canvas sharing entity 568. Master element library provides a library of graphical objects, that is, for example, images, icons, logos, animations, video clips, videos, user interface gadget templates, fonts and texts. Master element library 564 is used by a plurality of client devices to upload and download graphical objects. Canvas sharing entity 568 comprises information on a canvas in each client device connected to session server 560 during an active session. Canvas sharing entity 568 may also take care of distributing augmentation content that it has received from a single session party to other session parties.

In FIG. 5 there are three client devices, namely, a client device 510, a client device 520 and a client device 530. The internal functions of client devices 510, 520 and 530 are illustrated in FIG. 5 with boxes 512, 522 and 532, respectively. Client device 510 has an own broadcast receiver 506, whereas client devices 520 and 530 share a broadcast receiver 508. In client devices 510, 520 and 530 there is a canvas entity and an element library such as canvas entity 514 and element library 516 in client device 510.

The starting point in FIG. 5 is that client devices 510, 520 and 530 receive a broadcasted motion picture (not shown) from broadcast transmitter 504. Further, periodically client devices 510, 520 and 530 check master element library 564 to retrieve new graphical objects to their respective element libraries. During the broadcasted motion picture, client devices 510, 520 and 530 establish an augmentation content sharing session using session server 560. An augmentation content sharing session is established by an initiating party, for example, so that the initiating party first establishes a leg to session server 560 and invites other parties to the session either one-by-one or by referring to a party list provided to session server 560 prior to the session or during the establishing of the leg to session server 560. The availability of an augmentation content sharing session leg between initiating party and session server 560 may also be announced on a network server such as session server 560 or broadcast server 572. The announcement may also be given via an E-mail, a short message, an instant message, a broadcasted electronic program guide, a retrievable hypertext page, or any other data communication interface. The announcement may be used by further parties to connect a leg to the session server 560 so that they are connected to the session announced. In one embodiment of the invention, an augmentation content sharing session may also be established so that initiating party forms a two-party session with another party. Thereupon, either of the parties may invite further parties. In one embodiment of the invention, an augmentation content sharing session may also be established so that session server 560 forms a session to all parties at predefined specified time. The clients allowed to participate in a given session are verified by server 560 using access file 562. Access file 562 may comprise information on predefined user groups, buddy lists, required client properties or any other information that makes it possible to decide whether a party may be admitted to the session. Access file 562 or any other memory object in session server 560 may also store passwords, passcode or authentication key material that may be used to authenticate potential session parties before they are admitted to the augmentation content sharing session.

The session may be a Session Initiation Protocol (SIP) multiparty session or any other session agreed between the parties. The session may not have a continuous voice or audio stream associated it. Instead, client devices 510, 520 and 530 may exchange instant messages to share augmentation related messages.

In one embodiment of the invention, an augmentation content sharing session may be established directly between parties without a session server or an application layer proxy such as session server 560. This may mean that SIP messages are exchanged directly between client devices 510, 520 and 530. In one embodiment of the invention, the session may also be established using a peer-to-peer protocol, which may use a distributed hash table for at least one of session establishment, augmentation message routing and retrieval of identified graphical objects.

After the session has been established, the augmentation content is shared so that a party to the session specifies a moving or still object on his/her display to be augmented, for example, using the method illustrated in FIG. 4. Thereafter, the party selects a graphical object from a list presented by the client device on the display. The list may be pre-filtered based on a predicted type of the object to be augmented. The client device may display to the user information on the assigning of different predefined graphical objects to different function keys, keypad number keys or other keys on the remote control device. The indication may be in the form of a constellation picture which shows icons representing different graphical objects on the display in an order that corresponds to the order of the keys on the remote control device. The user may change the assignment with at least one key to be able to browse different graphical object available or suggested. During the selection of the graphical object by the user, the sending client device may follow the movement of the moving object using, for example, motion vectors associated with macro blocks that have been associated with the moving objects. In this way the sending client may ensure that the augmenting graphical object is not disassociated from the moving object on the display of the receiving spectators. Thereupon, the client device prepares an augmentation message that is sent to session server 560 and from there to at least one other session party.

The augmentation message may comprise an identity of the sending party, an identifier of the graphical object, for example, a Uniform Resource Identifier (URI), location and size information in a shared coordinate system, an optional text message, an optional audio clip, an optional reference to content stored elsewhere such as a Uniform Resource Locator (URL) or optional session information. The coordinates and size to the augmentation message are first computed by the sending client device. The sending client device converts coordinates in its own coordinate system to the shared coordinate system. At the receiving client device end, the shared coordinates and the size are translated to a coordinate system used by the receiving client device. The client device coordinate systems may correspond to the display resolution of a respective client device or the size of the moving object selection grid used in the client device. The shared coordinate system may have been chosen to be sufficiently large to support possible future display sizes. The location information may comprise at least one x and y values in a given coordinate system. Upon receiving the augmentation message, the receiving client device retrieves the graphical object using the identifier of the graphical object. The retrieval may be performed by checking first the local element library in the receiving client device and only thereafter by requesting the graphical object from a remote server such as session server 560. The retrieval may be performed using, for example, the Hypertext Transfer Protocol (HTTP) using the URI as a URL or from a Distributed Hash Table (DHT) using a peer-to-peer network protocol. The graphical object is then displayed in the position indicated by the location information transformed to the coordinate system of the receiving client device. The size is also transformed to the coordinate system of the receiving client device to determine the size on the display of the receiving client device.

If there is text in the augmentation message, the receiving client displays the text in association with the graphical object. If the graphical object is a text background object such as a bubble, the text is displayed inside the graphical object. If there is an audio clip in the augmentation message, the audio clip is played as the augmentation message is received. If there is a URL for content stored elsewhere, that is, other content than the graphical object, the content is also retrieved using the URL. If there is session information in the augmentation message, the session information is used to establish a further media component or session according to the information. The session information may comprise at least one of a Session Description Protocol (SDP) description, a SIP URI, an IP-address, an RTP port and a URL. The further media component or session is typically used to share audio or even additional video information with the sending party. The additional video information may be displayed in a separate window on the receiving client device display.

In one embodiment of the invention, the augmentation message may also comprise an expiry time, which is used by the receiving client to remove the graphical object from the display after the time has elapsed. The expiry time may be, for example, 20 seconds or any predefined time sufficient to view the graphical object and the optional text therein.

In one embodiment of the invention, if there are multiple graphical objects associated with a given moving object, that is, an object of the underlying motion picture, the user of the receiving client device may use the remote control device to drag each graphical object separately aside or to browse different layers of overlapping graphical objects.

In one embodiment of the invention, the augmentation message may also carry a time reference, which may be used by the receiving client device to access a video frame from a video frame buffer storing previous video frames, or a data structure with information on moving objects from previous video frames together with their position history, in order to find the right moving object using the provided coordinates at right time. The receiving client device must be able to follow the moving object to the right position in the frame currently being displayed. The following of a moving object may use, for example, at least one MPEG motion vector associated with at least one macro block at the position indicated by the coordinates. Augmentation object sharing between canvases in client devices 510, 520 and 530 is illustrated with arrows 581-584.

In one embodiment of the invention, an augmentation message may comprise visual features associated with the moving object selected such as so that the receiving client device may use the visual features to select the same moving object in the motion picture with or without coordinate information. The visual features in the message may comprise at least one of a plurality of texture types, a plurality of contour parameters, a plurality of color ranges, a plurality of area sizes for a given texture, a particular order of indicated texture types, object area size and a plurality motion vector length ranges, and at least one predefined object type automatically recognizable in the receiving client such as a human face.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A social service method, comprising:
providing an interactive service in association with a digital television motion picture service;
receiving the digital television motion picture service by a digital television broadcast signal via a broadcast network;
displaying the digital television motion picture to a spectator by means of a digital television receiver being able to modify the motion picture displayed to the spectator and having a bi-directional network connection via an IP network;
dividing television screens of a plurality of participants in a grid, dimensions of the grid being the same for the plurality of participants, the purpose of the grid being to provide position information of a graphical element;
connecting the plurality of participants to an interactive motion picture session, the plurality of participants comprising the spectator;
receiving by one of the plurality of participants a selection of a target area anywhere in the digital television motion picture, the target area comprising a moving object in the digital television motion picture, where the target area is selected based on the grid by the one of the plurality of participants;
automatically finding potential moving objects in the digital television motion picture;
confirming, by the one of the plurality of participants, one of the moving objects as being the moving object based on the finding;
receiving a selection of a graphical element to be associated with the target area;
translating the target area to the grid coordinate system shared by each participant in the interactive motion picture session, the grid being displayed on the motion picture for at least the one participant from whom the selection is received, the moving object being initially pointed by using the grid;

providing a time reference, the graphical element and the position information of the graphical element in the grid to the participants;

scaling the graphical element by the receivers of the plurality of participants, based on the number of pixels within a cell of the grid in the televisions of the respective participants, so that the graphical element is similar in size on the television screens of the plurality of participants;

accessing video frame buffers storing previous video frames, using the time reference, by the plurality of participants, in order to find the moving object using the provided coordinates at time of the time reference;

following the moving object to the position in the frame currently being displayed, the following of the moving object using at least one motion vector associated with at least one macro block at the position indicated by the position information, the following being performed in order to lock the graphical element to the moving object on the television screens of the plurality of participants; and removing the graphical element after an expiry time has elapsed.

2. The method according to claim 1, wherein said graphical elements are arranged in a library.

3. The method according to claim 2, wherein the same version of the library is provided to each participant.

4. The method according to claim 3, wherein the version of the library is checked before connecting a participant to said interactive motion picture session and, when a newer version of the library exists, said newer version is provided to the participant.

5. The method according to claim 1, wherein the method further comprises determining the properties of said graphical elements on a canvas.

6. The method according to claim 1, wherein the receiver comprises at least one of a digital television, an analog television, a set-top-box, a Home Theatre Personal Computer (HTPC), a laptop computer, a desktop computer, a palmtop computer, a mobile communication device, a gaming console and a portable gaming device.

7. The method according to claim 1, wherein the steps of automatically pre-selecting and confirming comprise automatically pre-selected multiple moving objects and selecting, by the one of the plurality of participants, one of the multiple moving objects.

8. A digital television receiver, comprising:
a memory; and
a processor configured
  to provide an interactive service in association with a digital television motion picture service,
  to receive the digital television motion picture service by a digital television broadcast signal via a broadcast network,
  to display the digital television motion picture to a spectator,
  to modify the motion picture displayed to the spectator,
  to have a bi-directional network connection via an IP network,
  to divide a television screen in a grid, dimensions of the grid being the same for a plurality of participants, the purpose of the grid being to provide position information of a graphical element,
  to connect the plurality of participants to an interactive motion picture session, the plurality of participants comprising the spectator,
  to receive by one of the plurality of participants a selection of a target area anywhere in the digital television motion picture, the target area comprising a moving object in the digital television motion picture, where the target area is selected based on the grid by the one of the plurality of participants,
  to automatically find potential moving objects in the digital television motion picture,
  to receive a confirmation, from the one of the plurality of participants, of one of the moving objects as being the moving object based on the finding,
  to receive a selection of a graphical element to be associated with the target area,
  to translate the target area to the grid coordinate system shared by each participant in the interactive motion picture session, the grid being displayed on the motion picture for at least the one participant from whom the selection is received, the moving object being initially pointed by using the grid,
  to provide a time reference, the graphical element and the position information of the graphical element in the grid to the plurality of the participants,
  to scale the graphical element by the receiver based on the number of pixels within a cell of the grid in the television screen, so that the graphical element is similar in size on the television screens of the plurality of participants,
  to access video frame buffers storing previous video frames, using the time reference, by the plurality of participants, in order to find the moving object using the provided coordinates at time of the time reference,
  to follow the moving object to the position in the frame currently being displayed, the following of the moving object using at least one motion vector associated with at least one macro block at the position indicated by the position information, the following being performed in order to lock the graphical element to the moving object on the television screens of the plurality of participants,
  to remove the graphical element after an expiry time has elapsed.

9. The receiver according to claim 8, wherein to automatically pre-select the moving object and to receive and confirmation comprise to automatically pre-select multiple moving objects and to select, by the one of the plurality of participants, one of the multiple moving objects.

10. A system for providing an interactive digital television motion picture service, comprising:
a digital television motion picture service provider; and
a plurality of receivers configured:
  to provide an interactive service in association with a digital television motion picture service, where the digital television motion picture is displayed to spectators by means of the plurality of digital television receivers being able to modify the digital television motion picture displayed to the spectators and having a bi-directional network connection via an IP network,
  to divide television screens of a plurality of participants in a grid, dimensions of the grid being the same for the plurality of participants, the purpose of the grid being to provide position information of a graphical element,
  to connect the plurality of participants to an interactive motion picture session, the plurality of participants comprising the spectator,
  to receive by one of the plurality of participants a selection of a target area anywhere in the motion picture, the target area comprising a moving object in the motion picture, where the target area is selected based on the grid by the one of the plurality of participants;

to automatically find potential moving objects in the digital television motion picture, to receive a confirmation, from the one of the plurality of participants, of one of the moving object as being selected as the moving object based on the finding, to receive a selection of a graphical element to be associated with the target area, to translate the target area to the grid coordinate system shared by each participant in the interactive motion picture session, the grid being displayed on the motion picture for at least the one participant from whom the selection is received, the moving object being initially pointed by using the grid, to provide a time reference, the graphical element and the position information of the graphical element in the grid to the plurality of participants, to scale the graphical element by the receivers of the plurality of participants, based on the number of pixels within a cell of the grid in the televisions of the respective participants, so that the graphical element is similar in size on the television screens of the plurality of participants, to access video frame buffers storing previous video frames, using the time reference, by the plurality of participants, in order to find the moving object using the provided coordinates at time of the time reference, to follow the moving object to the position in the frame currently being displayed, the following of the moving object using at least one motion vector associated with at least one macro block at the position indicated by the position information, the following being performed in order to lock the graphical element to the moving object on the television screens of the plurality of participants; and to remove the graphical element after an expiry time has elapsed.

11. The system according to claim 10, wherein the system further comprises a server for interactive services.

12. The system according to claim 11, wherein the server is configured to provide a graphical element library to each participant.

13. The system according to claim 10, wherein to automatically pre-select the moving object and to receive and confirmation comprise to automatically pre-select multiple moving objects and to select, by the one of the plurality of participants, one of the multiple moving objects.

14. A computer program stored on a non-transitory computer readable medium, the computer program comprising code adapted to cause the following when executed on a data-processing system:

providing an interactive service in association with a digital television motion picture service;

receiving the digital television motion picture service by a digital television broadcast signal via a broadcast network;

displaying the digital television motion picture to a spectator by means of a digital television receiver being able to modify the motion picture displayed to the spectator and having a bi-directional network connection via an IP network;

dividing television screens of a plurality of participants in a grid, dimensions of the grid being the same for the plurality of participants, the purpose of the grid being to provide position information of a graphical element;

connecting the plurality of participants to an interactive motion picture session, the plurality of participants comprising the spectator;

receiving by one of the plurality of participants a selection of a target area anywhere in the digital television motion picture, the target area comprising a moving object in the digital television motion picture, where the target area is selected based on the grid by the one of the plurality of participants;

automatically finding potential moving objects in the digital television motion picture;

confirming one of the moving objects as being the moving object, by the one of the plurality of participants, based on the finding;

receiving a selection of a graphical element to be associated with the target area;

translating the target area to the grid coordinate system shared by each participant in the interactive motion picture session, the grid being displayed on the motion picture for at least the one participant from whom the selection is received, the moving object being initially pointed by using the grid;

providing a time reference, the graphical element and the position information of the graphical element in the grid to the plurality of participants;

scaling the graphical element by the receivers of the plurality of participants, based on the number of pixels within a cell of the grid in the televisions of the respective participants, so that the graphical element is similar in size on the television screens of the plurality of participants;

accessing video frame buffers storing previous video frames, using the time reference, by the plurality of participants, in order to find the moving object using the provided coordinates at time of the time reference;

following the moving object to the position in the frame currently being displayed, the following of the moving object using at least one motion vector associated with at least one macro block at the position indicated by the position information, the following being performed in order to lock the graphical element to the moving object on the television screens of the plurality of participants; and removing the graphical element after an expiry time has elapsed.

15. The computer program according to claim 14, wherein the non-transitory computer readable medium comprises at least one of an optical disk, a magnetic disk, a magneto-optical disk, a memory chip, and a memory cartridge.

16. The computer program according to claim 14, wherein the steps of automatically pre-selecting and confirming comprise automatically pre-selected multiple moving objects and selecting, by the one of the plurality of participants, one of the multiple moving objects.

17. A digital television receiver, comprising:

a television for displaying a digital television motion picture to a spectator;

means for receiving the digital television motion picture service by a digital television broadcast signal via a broadcast network;

means for modifying the digital television motion picture displayed to the spectator;

means for having a bi-directional network connection via an IP network;

means for connecting a plurality of participants to an interactive motion picture session;

means for receiving by one of the plurality of participants a selection of a target area anywhere in the digital television motion picture, the target area comprising a moving object in the digital television motion picture, where the target area is selected based on the grid by the one of the plurality of participants;

means for automatically finding potential moving objects in the digital television motion picture;

means for confirming, by the one of the plurality of participants, one of the moving objects as being the moving object based on the finding;

means for receiving a selection of a graphical element to be associated with the target area;

means for dividing the screen of the television in a grid, the dimensions of the grid being the same in the televisions of each of the plurality of the participants, the purpose of the grid being to provide position information of the graphical element;

means for translating the target area to the grid coordinate system shared by each of the plurality of participants in the interactive motion picture session, the grid being displayed on the motion picture for at least the one participant from whom the selection is received, the moving object being initially pointed by using the grid;

means for providing a time reference, the graphical element and the position information of the graphical element in the grid to the plurality participants;

means for scaling the graphical element based on the number of pixels within a cell of the grid in the television so that the graphical element is similar in size as on the television screens of the plurality of participants;

means for accessing video frame buffers storing previous video frames, using the time reference, by the plurality of participants, in order to find the moving object using the provided coordinates at time of the time reference;

means for following the moving object to the position in the frame currently being displayed, the following of the moving object using at least one motion vector associated with at least one macro block at the position indicated by the position information, the following being performed in order to lock the graphical element to the moving object on the television screens of the plurality of participants; and means for removing the graphical element after an expiry time has elapsed.

18. The receiver according to claim 17, wherein the means for automatically pre-selecting and means for confirming comprise means for automatically pre-selected multiple moving objects and means for selecting, by the one of the plurality of participants, one of the multiple moving objects.

* * * * *